(12) United States Patent
Xu et al.

(10) Patent No.: US 10,429,700 B2
(45) Date of Patent: Oct. 1, 2019

(54) DISPLAY MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Xiaochuan Chen, Beijing (CN); Lei Wang, Beijing (CN); Wenqing Zhao, Beijing (CN); Ming Yang, Beijing (CN); Qian Wang, Beijing (CN); Pengcheng Lu, Beijing (CN); Xiaochen Niu, Beijing (CN); Jian Gao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/539,916

(22) PCT Filed: Oct. 25, 2016

(86) PCT No.: PCT/CN2016/103245
§ 371 (c)(1),
(2) Date: Jun. 26, 2017

(87) PCT Pub. No.: WO2017/173815
PCT Pub. Date: Oct. 12, 2017

(65) Prior Publication Data
US 2018/0107074 A1    Apr. 19, 2018

(30) Foreign Application Priority Data

Apr. 6, 2016   (CN) .................. 2016 2 0282196 U

(51) Int. Cl.
*G02F 1/1337* (2006.01)
*G09G 3/34* (2006.01)
(Continued)

(52) U.S. Cl.
CPC ...... *G02F 1/133788* (2013.01); *G02F 1/1368* (2013.01); *G02F 1/1396* (2013.01);
(Continued)

(58) Field of Classification Search
None
See application file for complete search history.

(56) References Cited

U.S. PATENT DOCUMENTS

| 5,838,407 A | 11/1998 | Chigrinov et al. |
| 2009/0195559 A1* | 8/2009 | Verstraete ......... G02F 1/133603 345/690 |

(Continued)

FOREIGN PATENT DOCUMENTS

| CN | 104111552 A | 10/2014 |
| CN | 104133320 A | 11/2014 |

(Continued)

OTHER PUBLICATIONS

International Search Report and Written Opinion dated Jan. 18, 2017; PCT/CN2016/103245.

*Primary Examiner* — Ryan Crockett
(74) *Attorney, Agent, or Firm* — Ladas & Parry LLP

(57) ABSTRACT

A display module and a display device are disclosed. The display module includes an organic light emitting diode substrate and a liquid crystal panel, wherein the organic light emitting diode substrate includes a base and a plurality of organic light emitting diodes disposed on a side of the base adjacent to the liquid crystal panel; the liquid crystal panel includes a plurality of sub-pixels configured to filter light; wherein the base is a silicon base, on which a first driving (Continued)

circuit and a second driving circuit are disposed, the first driving circuit configured to drive the respective organic light emitting diodes to emit light and the second driving circuit configured to the respective sub-pixels to filter light.

14 Claims, 4 Drawing Sheets

(51) Int. Cl.
- G09G 3/36 (2006.01)
- G02F 1/1335 (2006.01)
- G02F 1/1368 (2006.01)
- G02F 1/139 (2006.01)
- G09G 3/3225 (2016.01)

(52) U.S. Cl.
CPC .. *G02F 1/133514* (2013.01); *G02F 1/133602* (2013.01); *G02F 1/133603* (2013.01); *G02F 1/133606* (2013.01); *G02F 1/133621* (2013.01); *G02F 1/133711* (2013.01); *G02F 1/133753* (2013.01); *G09G 3/3225* (2013.01); *G09G 3/34* (2013.01); *G09G 3/3426* (2013.01); *G09G 3/36* (2013.01); *G09G 3/3607* (2013.01); *G09G 3/3648* (2013.01); *G02F 2201/44* (2013.01); *G09G 2300/023* (2013.01)

(56) References Cited

U.S. PATENT DOCUMENTS

| | | | |
|---|---|---|---|
| 2012/0162053 A1* | 6/2012 | Lee | H01L 27/3279 345/80 |
| 2015/0269893 A1* | 9/2015 | Wu | G02B 27/2214 345/419 |
| 2015/0331508 A1* | 11/2015 | Nho | G06F 3/0421 345/173 |
| 2016/0042703 A1* | 2/2016 | Fan | G09G 3/3607 345/88 |
| 2016/0282667 A1 | 9/2016 | Fan | |
| 2017/0263199 A1* | 9/2017 | Kimura | G09G 3/3607 |
| 2017/0329368 A1* | 11/2017 | Rho | G06F 1/1652 |

FOREIGN PATENT DOCUMENTS

| | | |
|---|---|---|
| CN | 205487282 U | 8/2016 |
| JP | 05232473 A | 9/1993 |

* cited by examiner

DISPLAY MODULE AND DISPLAY DEVICE

TECHNICAL FIELD

Embodiments of the present invention relates to a display module and a display device.

BACKGROUND

Organic Light Emitting Diode (OLED) display technology has advantages such as low energy consumption. However, The OLED has a short lifespan as luminance of the emitted light is frequently changed according to displayed contents in operation. For this, there is a technology combining OLED display and Liquid Crystal Display (LCD). In a display device of such display device, an OLED substrate is provided, which comprises a plurality of OLEDs configured to emit light of different colors, a LCD panel which comprises a plurality of sub-pixels configured to filter light is disposed outside of the OLED substrate, light emitted from the respective OLED is filtered by the sub-pixels so as to have a desired luminance and to perform display. In such a display device, the luminance is controlled by filtering light through the sub-pixels of the LCD panel. Thus, the luminance of light emitted from the OLEDs is not required to be changed frequently, and the lifespan of OLEDs will be elongated.

Obviously, in order for normal operation, both the OLED substrate and the LCD panel require a driving circuit for supplying driving signal (for example, gate scanning signals, data voltage signals, common voltage signals, and the like) thereto. Conventional driving circuits are integrated in a Driver IC which is disposed on a printed circuit board (PCB) and is electrically connected to the OLED substrate and the LCD panel through a flexible printed circuit (FPC).

Clearly, in such a display device, the OLED substrate and the LCD panel are respectively controlled by different driving circuits, and two different driver IC and two flexible printed circuits are required, thereby causing a large amount of elements, a complex structure and high cost.

SUMMARY

At least one embodiment of the present disclosure provides a display module comprising a liquid crystal panel and an organic light emitting diode substrate, wherein The liquid crystal panel comprises a plurality of sub-pixels configured to filter light; and The organic light emitting diode substrate comprises a base and a plurality of organic light emitting diodes disposed on a side of the base adjacent to the liquid crystal panel, wherein the base is a silicon base, on which a first driving circuit and a second driving circuit are disposed, the first driving circuit configured to drive the respective organic light emitting diodes to emit light and the second driving circuit configured to the respective sub-pixels to filter light.

In one embodiment of the present disclosure, both the first driving circuit and the second deriving circuit are disposed on a side of the base adjacent to the liquid crystal panel.

In one embodiment of the present disclosure, the liquid crystal panel comprises an array substrate and a cover substrate which are cell-assembled, the array substrate is disposed on a side of the liquid crystal panel adjacent to the organic light emitting diode substrate and a thin film transistor array circuit is disposed on a side of the array substrate adjacent to the cover substrate, the thin film transistor array circuit is configured to control the respective sub-pixels under driving of the second driving circuit.

In one embodiment of the present disclosure, the array substrate is provided with a through hole, through which the second driving circuit is electrically connected to the thin film transistor array circuit.

In one embodiment of the present disclosure, a plurality of first connection terminals which are electrically connected with the second driving circuit are provided on a side of the base adjacent to the liquid crystal panel, a plurality of second connection terminals which correspond to the plurality of first connection terminals and are electrically connected with the thin film transistor array circuit through the through hole are provided on a side of the array substrate adjacent to the organic light emitting diode substrate, the respective first connection terminals contacts with the respective second connection terminals.

In one embodiment of the present disclosure, the plurality of organic light emitting diodes comprise various colors organic light emitting diodes.

In one embodiment of the present disclosure, each of the plurality of organic light emitting diodes is a white organic light emitting diode, a color filter film is disposed on the respective organic light emitting diode, the color filter film comprises a color filter film of various colors.

In one embodiment of the present disclosure, the display module is a dual field display module or a3D display module, wherein each of the plurality of organic light emitting diodes corresponds to two sub-pixels, light emitted from the respective organic light emitting diodes passes through the corresponding two sub-pixels and is transmitted to a first position and a second position respectively.

At least one embodiment of the present disclosure provides a display device, comprising:

The display module mentioned above and a control signal source, the control signal source is electrically connected to the first driving circuit and the second driving circuit via a connector, respectively.

In one embodiment of the present disclosure, the connector is a flexible printed circuit.

In the embodiments of the present disclosure, the organic light emitting diode substrate of the display module adopts a silicon base. Thus, various gate structures can be prepared directly on the base, which is equivalent to that driving circuits in each driving IC is manufactured directly on the organic light emitting diode substrate. The display module does not require independent driver ICs any more, and has a simple structure and can be manufactured with less elements, high integration and low cost.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
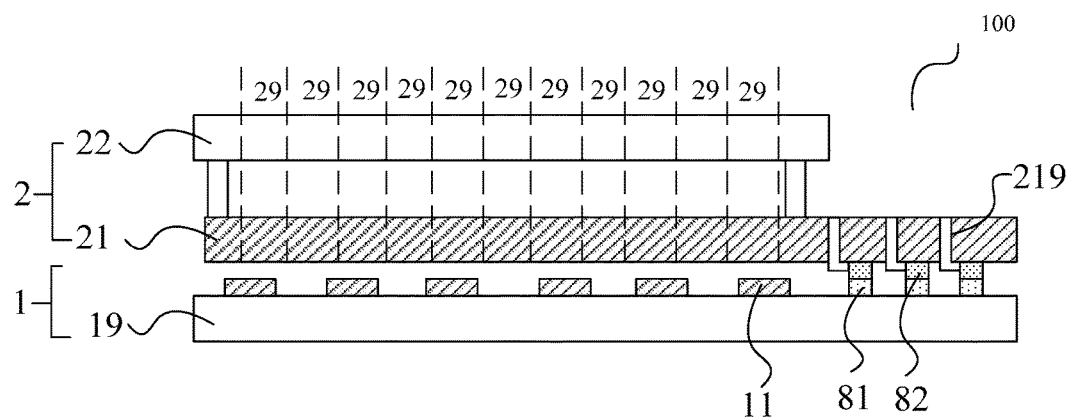
FIG. 1 is an illustrative sectional structural view of a display module according to one embodiment of the present disclosure.

REFERENCE SIGNS 1, organic light emitting substrate
11, organic light emitting diode
111, color filter film
19, base
2, liquid crystal panel
21, array substrate
211, thin film transistor array circuit
219, through hole
22, cover substrate
29, sub-pixels
81, first connection terminal
82, second connection terminal
91, first driving circuit
92, second driving circuit
100, display module

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

At least one embodiment of the present disclosure provides a display module 100. As shown in FIG. 1 to FIG. 5, the display module 100 comprises an organic light emitting diode substrate 1 and a liquid crystal panel 2, wherein the organic light emitting diode substrate 1 comprises a base 19 and a plurality of organic light emitting diodes 11 disposed on a side of the base 19 adjacent to the liquid crystal panel 2; and the liquid crystal panel 2 comprises a plurality of sub-pixels 29 configured to filter light.

That is to say, the display module 100 comprises an organic light emitting diode substrate 1, a plurality of organic light emitting diodes 11 are disposed on the base 19 of the organic light emitting diode substrate 1 and the respective organic light emitting diode can emit light independently.

In embodiments of the present disclosure, the organic light emitting diode 11 can comprise a cathode, an anode, and an organic light emitting layer. The organic light emitting diode 11 can further comprise additional function layer, such as an electron injection layer, an hole injection layer, an electron transport layer, an hole transport layer, and etc. The structure of the organic light emitting layer 11 will not be described in detail in the present disclosure.

A liquid crystal panel 2 is disposed at the light outgoing side of the organic light emitting layer 11. The liquid crystal panel 2 is similar to a conventional liquid crystal display panel, and comprises a plurality of sub-pixels 29 which filters light incident thereon. Thus, light emitted from the respective organic light emitting diodes 11 passes through its corresponding sub-pixel and is filtered to have desired luminance so as to perform display.

In one embodiment of the present disclosure, the plurality of organic light emitting diodes 11 comprises various colors organic light emitting diodes 11.

That is to say, as illustrated in FIG. 1, in order to obtain the effect of color display, the plurality organic light emitting diodes of the organic light emitting diode substrate 1 can comprise various color light emitting diodes, such as red organic light emitting diode, green organic light emitting diode and blue organic light emitting diode, and the like. Thus, the display module does not require a color filter film, and has a simple structure.

Figure 2:
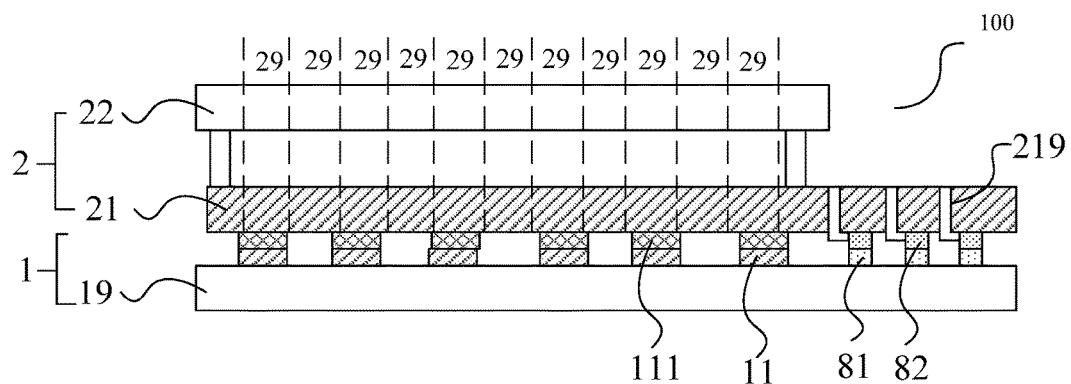
FIG. 2 is an illustrative sectional structural view of a display module according to another embodiment of the present disclosure.

In one embodiment of the present disclosure, as illustrated in FIG. 2, in order to obtain color display, each of the plurality organic light emitting diodes 11 is a white organic light emitting diode and a color filter film 111 is disposed on the respective organic light emitting diodes 11 and comprises various colors filters.

That is to say, as illustrated in FIG. 2, in order to obtain color display, all the plurality organic light emitting diodes 11 are white organic light emitting diodes which emit white light. And a color filter film 111 with various color filters is disposed on the respective white organic light emitting diodes. Thus, light emitted from the white organic light emitting diodes will become a desired color light after being filtered by the color filter film 1111.

Of course, in order for color display, alternative implementation manners can be adopted, for example, a color filter film 111 is disposed outside of the liquid crystal panel 2.

In one embodiment of the present disclosure, the display module is a dual field display module or a 3D display module, wherein the respective organic light emitting diodes 11 corresponds to two sub-pixels 29, and light emitted from each of the organic light emitting diodes 11 are transmitted to the first position and the second position after filtered by the corresponding sub-pixels 29.

Figure 3:
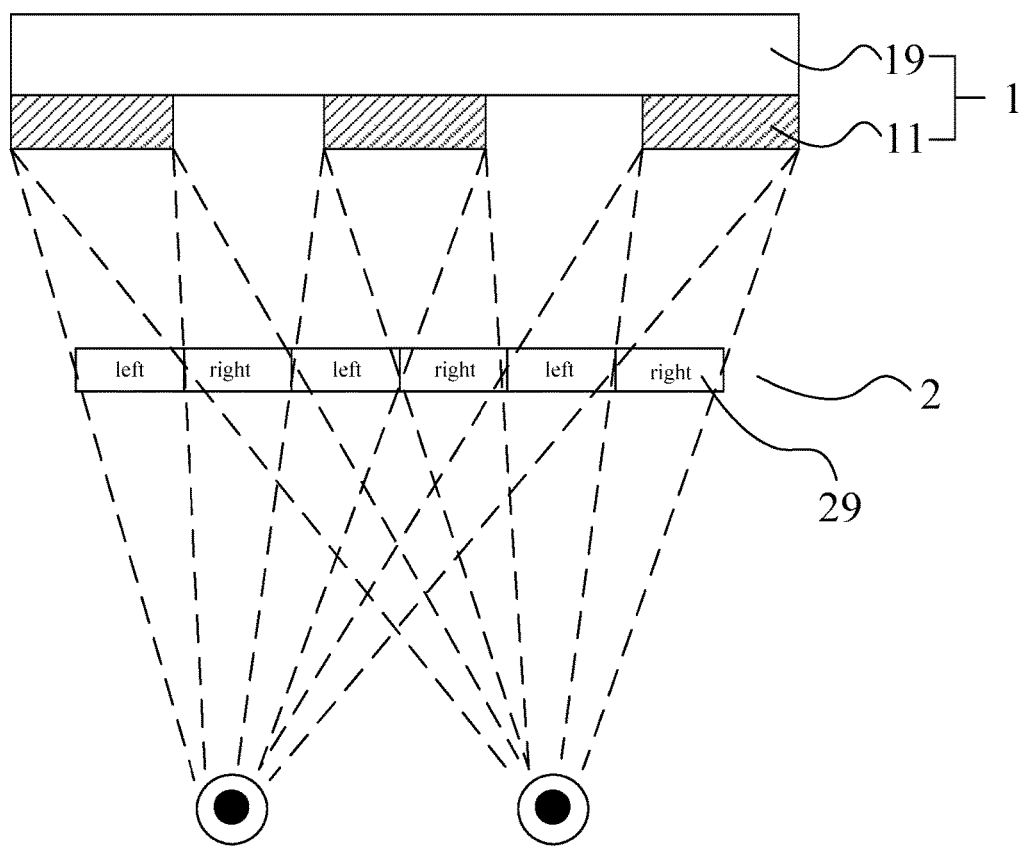
FIG. 3 is a schematic diagram of implementing 3D display through a display module according to one embodiment of the present disclosure.

That is to say, as illustrated in FIG. 3, in the display module, a ratio of the number of the organic light emitting diodes 11 to the number of the sub-pixels is 1:2 (an interval is disposed between adjacent organic light emitting diodes 11, for example, adjacent organic light emitting diodes are separated by a black matrix). Thus, each of the organic light emitting diodes 11 corresponds to two sub-pixels 29 (the sub-pixels indicated as left and right in the figure), and it can be ensured that light emitted from the respective organic light emitting diodes can be transmitted to different positions (such as the left and right eyes, or different view zone) after passing through its corresponding two sub-pixels 29, by setting positions of the organic light emitting diodes and the sub-pixels 29, distance between the organic light emitting diode substrate 1 and the liquid crystal panel 2, so as to obtain dual display or 3D display. In the present disclosure, a plurality of organic light emitting diodes 11 are adopted in the display module to emit light, without adopt a light guide plate for emitting light as a whole, causing light emitting positions accurately controlled (as long as organic light emitting diode is not disposed at a position where it is not required to emit light). Such a configuration is more suitable to 3D display or dual field display.

Different from conventional display device, the base 19 of the organic light emitting diode substrate 1 according to embodiments of the present disclosure is a silicon base, on which the first driving circuit 91 and the second driving circuit 92 are disposed, the first driving circuit 91 configured to drive the respective organic light emitting diodes 11 to emit light, and the second driving circuit 92 configured to drive the respective sub-pixels 29 to filter light.

Figure 4:
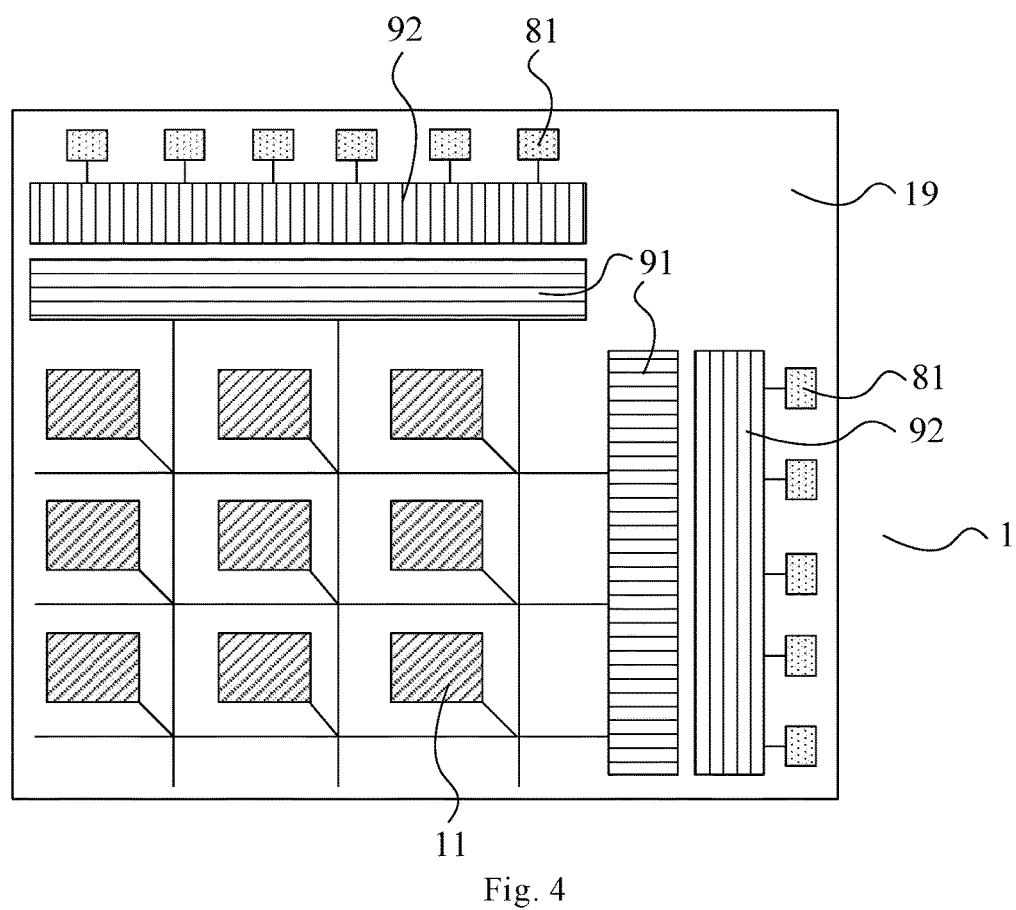
FIG. 4 is a top view illustrating a structure of an organic light emitting substrate of a display module according to one embodiment of the present disclosure.

As the base 19 of the organic light emitting diode substrate 1 according to embodiments of the present disclosure is a silicon base (also referred to as silicon slice or wafer) which is a basic material for preparing driver IC, rather than a glass base or a polymer base, as illustrated in FIG. 4, various gate structures 91 and 92 is formed to be a basic circuit in four of complementary metal oxide semiconductor (CMOS) directly on the base 19, so as to form the first driving circuit and the second driving circuit. That is, the driving circuits of the respective driver IC is manufactured directly in the organic light emitting diode substrate 1, such that independent driver ICs are not required in the display module according to the embodiments of the present disclosure, and the display module has less elements, high integration, and a simple structure, and is manufactured at low cost.

Implementation of forming gate structures on a silicon base can be referred to conventional technology, and will not be elaborated herein.

In one embodiment of the present disclosure, the first driving circuit 91 and the second driving circuit 92 are disposed on a side of the base 19 adjacent to the liquid crystal panel 2.

In the embodiments of the present disclosure, as the silicon base is opaque, the organic light emitting diodes 11 is necessarily disposed on a side of the silicon base adjacent to the liquid crystal panel 2, so as to make light emitted from the organic light emitting diodes 11 enter the liquid crystal panel 2.

The first driving circuit 91 is required to be electrically connected to the respective organic light emitting diodes 11 (for example, though a gate line, a data line, a thin film transistor and the like). In one embodiment of the present disclosure, the first driving circuit 91 and the organic light emitting diodes 11 are disposed on the same side of the base 19, so as to facilitating the electrical connection therebetween.

The second driving circuit 92 is required to be electrically connected to a corresponding display structure (for example, a pixel electrode and a common electrode) of the sub-pixels 29 of the liquid crystal panel 2 (for example, through a gate line, a data line, a thin film transistor and the like). In one embodiment of the present disclosure, the second driving circuit 92 is also disposed on the side of the base 19 adjacent to the liquid crystal panel 2, so as to facilitating connection the second driving circuit 92.

In one embodiment of the present disclosure, the liquid crystal panel 2 comprises an array substrate 21 and a cover substrate 22 which are cell-assembled. The array substrate 21 is disposed on a side of the liquid crystal panel 2 adjacent to the organic light emitting diode substrate 1, and the array substrate 21 is provided with thin film transistor array circuit 211 on the side thereof adjacent to the cover substrate 22. The thin film transistor array 211 is configured to control the respective sub-pixels 29 under driving of the second driving circuit 92.

Figure 5:
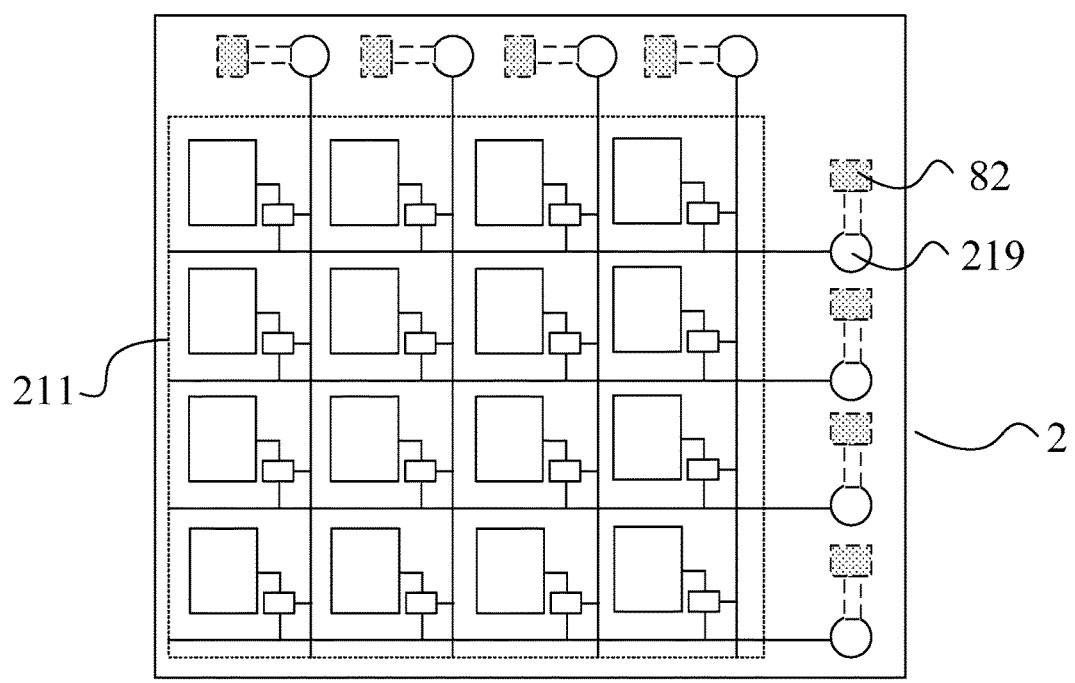
FIG. 5 is a top view illustrating a structure of an array substrate of a display module according to one embodiment of the present disclosure.

As illustrate in FIG. 1, FIG. 2 and FIG. 5, the liquid crystal panel 2 can comprise a conventional array substrate 21, the array substrate 21 is provided a thin film transistor array circuit 211 (comprising a gate line, a data line, and a thin film transistor, and the like) configured to be electrically connected to a display structure (such as a pixel electrode, a common electrode, and the like) of the respective sub-pixels. As long as signals from the second driving circuit 92 are supplied to the respective gate line and the respective data line, the respective sub-pixels 29 can be driven and controlled. In one embodiment of the present disclosure, the array substrate 21 is disposed on a side of the liquid crystal panel 2 adjacent to the organic light emitting diode substrate 1, for facilitating electrical connection between the thin film transistor array circuit 211 and the second driving circuit 92.

Of course, the liquid crystal panel 2 can further comprise other conventional structure, such as a liquid crystal layer, an upper polarizer, a lower polarizer, and the like, which will not be elaborated herein.

In one embodiment of the present disclosure, the array substrate 21 is provided with a through hole 219, through which the second driving circuit 92 is electrically connected to the thin film transistor array circuit 211.

As illustrate in FIG. 1, FIG. 2 and FIG. 5, the thin film transistor array circuit 211 is disposed on the inner side of the liquid crystal panel 2 (that is, a side of the array substrate 21 adjacent to the cover substrate 22). A through hole 219 (TGV, Through Glass Via) is formed in a glass base of the array substrate 21 so as to electrically connect the thin film transistor array circuit 211 and the second driving circuit 92. Through a lead or a conductive pillar in the through hole 219, signals can be transmitted between the two sides of the array substrate 21.

In one embodiment of the present disclosure, a plurality of first connection terminals 81 which is connected with the second driving circuit 92 are disposed on a side of the base adjacent to the liquid crystal panel 2. A plurality of second connection terminals (82) corresponding to the first connection terminals are disposed on a side of the array substrate 21 adjacent to the organic light emitting diode substrate 1. The second connection terminals are connected to the thin film transistor array circuit 211 through the through hole 219, and the first connection terminals 81 is in contact with the second connection terminals 82.

That is to say, as illustrate in FIG. 1, FIG. 2 and FIG. 5, the thin film transistor array circuit 211 is connected to the other side of the array substrate 21 through the through hole 219. Correspondingly, as illustrated in FIG. 4, on the base 19 of the organic light emitting diode substrate 1, the second driving circuit 92 can be connected with the plurality of first terminals 81 (such as pads). Thus, after disposing the liquid crystal panel 2 outside of the light outgoing surface of the organic light emitting diode substrate 1, the corresponding first connection terminals 81 and second connection terminals 82 can be in direct contact with each other, thereby achieving electrical connection between the thin film transistor array circuit 211 and the second driving circuit 92.

Of course, the electrical connection between the thin film transistor array circuit 211 and the second driving circuit 92 can be achieved through other manners. For example, the first terminals 81 and the second terminals 82 can be electrically connected through conductive material (such as Anisotropic Conductive Adhesive, ACA). And for another example, the electrical connection between the thin film transistor array circuit 211 and the second driving circuit 92 can be achieved through connection lines disposed at the lateral sides of the organic light emitting diode substrate 1 and the array substrate 21, details of which will not be elaborated herein.

At least one embodiment of the present disclosure provides a display device comprising the display module and a control signal source, wherein the control signal source is connected to the first driving circuit and the second driving circuit respectively through a connector.

In the embodiments of the present disclosure, the display device can be any product or component having a display function such as electronic paper, a cell phone, a tablet computer, a television set, a display, a laptop, a digital photo frame, a navigator, or the like.

The control signal source is a device configured to supply a control signal to the two driving circuits, which can be a control circuit connected to a graphics card. The control circuit is then electrically connected to the display module (for example, the first driving circuit and the second driving circuit) through a connector.

In one embodiment of the present disclosure, the connector is a flexible printed circuit (FPC).

The flexible printed circuit is flexible, which makes it possible to change the relative position of the control signal source and the display module and to be used more flexible.

In the display device of the embodiments of the present disclosure, as the first driving circuit and the second driving circuit is disposed in the organic light emitting diode substrate, only one connector (i.e., the flexible printed circuit) is required to connect the first driving circuit and the second driving circuit to the control signal source, thereby reducing the number of elements, enhancing the integration and lower the cost.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201620282196.2 filed on Apr. 6, 2016 the disclosure of which is hereby entirely incorporated by reference.

The invention claimed is:

1. A display module comprising a liquid crystal panel and an organic light emitting diode substrate, wherein the liquid crystal panel comprises a plurality of sub-pixels configured to filter light; and the organic light emitting diode substrate comprises a base and a plurality of organic light emitting diodes disposed on a side of the base adjacent to the liquid crystal panel, wherein the base is a silicon base, on which a first driving circuit and a second driving circuit are disposed, the first driving circuit configured to drive the respective organic light emitting diodes to emit light and the second driving circuit configured to drive the respective sub-pixels to filter light;

wherein the liquid crystal panel comprises an array substrate and a cover substrate which are cell-assembled, the array substrate is disposed on a side of the liquid crystal panel adjacent to the organic light emitting diode substrate and a thin film transistor array circuit is disposed on a side of the array substrate adjacent to the cover substrate, the thin film transistor array circuit is configured to control the respective sub-pixels under driving of the second driving circuit;

wherein the array substrate is provided with a through hole, through which the second driving circuit is electrically connected to the thin film transistor array circuit;

wherein a plurality of first connection terminals which are electrically connected with the second driving circuit are provided on a side of the base adjacent to the liquid crystal panel;

a plurality of second connection terminals which correspond to the plurality of first connection terminals and are electrically connected with the thin film transistor array circuit through the through hole are provided on a side of the array substrate adjacent to the organic light emitting diode substrate; and the respective first connection terminals contacts with the respective second connection terminals.

2. The display module according to claim 1, wherein both the first driving circuit and the second driving circuit are disposed on a side of the base adjacent to the liquid crystal panel.

3. The display module according to claim 2, wherein the liquid crystal panel comprises an array substrate and a cover substrate which are cell-assembled, the array substrate is disposed on a side of the liquid crystal panel adjacent to the organic light emitting diode substrate and a thin film transistor array circuit is disposed on a side of the array substrate adjacent to the cover substrate, the thin film transistor array circuit is configured to control the respective sub-pixels under driving of the second driving circuit.

4. The display module according to claim 3, wherein the array substrate is provided with a through hole, through which the second driving circuit is electrically connected to the thin film transistor array circuit.

5. The display module according to claim 2, wherein the plurality of organic light emitting diodes comprise various colors organic light emitting diodes.

6. The display module according to claim 2, wherein each of the plurality of organic light emitting diodes is a white organic light emitting diode, a color filter film is disposed on the respective organic light emitting diode, the color filter film comprises a color filter film of various colors.

7. The display module according to claim 2, wherein the display module is a dual field display module or a 3D display module, and
wherein each of the plurality of organic light emitting diodes corresponds to two sub-pixels, light emitted from the respective organic light emitting diodes passes through the corresponding two sub-pixels and is transmitted to a first position and a second position respectively.

8. The display module according to claim 2, wherein the base is a silicon base, and at least one of the first driving circuit and the second driving circuit is formed by gate structures directly formed in the base.

9. The display module according to claim 1, wherein the plurality of organic light emitting diodes comprise various colors organic light emitting diodes.

10. The display module according to claim 1, wherein each of the plurality of organic light emitting diodes is a white organic light emitting diode, a color filter film is disposed on the respective organic light emitting diode, the color filter film comprises a color filter film of various colors.

11. The display module according to claim 1, wherein the display module is a dual field display module or a 3D display module, and
wherein each of the plurality of organic light emitting diodes corresponds to two sub-pixels, light emitted from the respective organic light emitting diodes passes through the corresponding two sub-pixels and is transmitted to a first position and a second position respectively.

12. The display module according to claim 1, wherein the base is a silicon base, and at least one of the first driving circuit and the second driving circuit is formed by gate structures directly formed in the base.

13. A display device comprising the display module according to claim 1, and further comprising a control signal source which is electrically connected to the first driving circuit and the second driving circuit via a connector, respectively.

14. The display device according to claim 13, wherein the connector is a flexible printed circuit.

\* \* \* \* \*